United States Patent
Haustein et al.

(10) Patent No.: US 7,743,198 B2
(45) Date of Patent: Jun. 22, 2010

(54) LOAD DISTRIBUTION IN STORAGE AREA NETWORKS

(75) Inventors: Nils Haustein, Soergenloch (DE); Wolfgang Mueller, Meisenheim (DE); Ulf Troppens, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/066,247

(22) PCT Filed: Jul. 13, 2006

(86) PCT No.: PCT/EP2006/064191
§ 371 (c)(1),
(2), (4) Date: Mar. 7, 2008

(87) PCT Pub. No.: WO2007/036372
PCT Pub. Date: Apr. 5, 2007

(65) Prior Publication Data
US 2008/0250178 A1    Oct. 9, 2008

(30) Foreign Application Priority Data
Sep. 8, 2005    (EP)    .................. 05108246

(51) Int. Cl.
G06F 15/173 (2006.01)
(52) U.S. Cl. ...................... 710/316; 709/241
(58) Field of Classification Search ........... 709/241; 710/316
See application file for complete search history.

(56) References Cited

U.S. PATENT DOCUMENTS 5,926,463 A * 7/1999 Ahearn et al. ............... 370/254

(Continued)

OTHER PUBLICATIONS

PCT International Search Report & Written Opinion dated Nov. 15, 2006 for Application No. PCT/EP2006/064191 filed Jul. 13, 2006.

(Continued)

*Primary Examiner*—Paul R Myers
(74) *Attorney, Agent, or Firm*—David Victor; Konrad Raynes & Victor LLP

(57) ABSTRACT

A load balancing method and system for identifying an input/output (I/O) network path from a set off I/O network paths is provided by the invention. The set off I/O network paths connect a host system via a network to a storage subsystem. The host system comprises at least one host bus adapter (HBA) and the storage subsystem comprises at least one I/O device and the network comprises at least one network device. Each of the HBA, the I/O device and the network device comprise at least one I/O port. For each I/O port of each HBA, an HBA port limit is determined. Additionally the set of I/O network paths which connect the I/O port of each of the HBA via the I/O ports of the network device to the I/O port of the I/O device is identified. Then a fabric utilization limit is determined for each I/O network path and a HBA port utilization is determined for each I/O port of the at least one HBA. All network paths are discarded for which the HBA port utilization is greater than the HBA port limit. For each of the remaining paths a network path distance is determined. All I/O network paths for which the network path distance is greater than the path distance limit are discarded. Then for each of the remaining paths a fabric utilization is determined. All I/O network paths for which the fabric utilization is greater than the fabric utilization limit are discarded and the I/O network path is determined from the remaining network paths.

24 Claims, 3 Drawing Sheets

U.S. PATENT DOCUMENTS

| | | | |
|---|---|---|---|
| 6,256,675 B1 * | 7/2001 | Rabinovich | 709/241 |
| 6,618,761 B2 * | 9/2003 | Munger et al. | 709/241 |
| 6,920,498 B1 * | 7/2005 | Gourlay et al. | 709/227 |
| 6,952,401 B1 * | 10/2005 | Kadambi et al. | 370/232 |
| 6,963,927 B1 * | 11/2005 | Lee et al. | 709/241 |
| 7,111,074 B2 * | 9/2006 | Basturk | 709/241 |
| 2004/0042489 A1 | 3/2004 | Messick et al. | |

OTHER PUBLICATIONS

PCT Notification Concerning Transmittal of International Preliminary Report on Patentability and Written Opinion dated Mar. 20, 2008 for Application No. PCT/EP2206/064191 filed Jul. 13, 2006.

* cited by examiner

LOAD DISTRIBUTION IN STORAGE AREA NETWORKS

FIELD OF THE INVENTION

The invention relates to storage area networks in general and in particular to the dynamical distribution of input/output workload within a storage area network.

BACKGROUND AND PRIOR ART

In modern IT systems servers and tape drives are connected via a storage area network (e.g. Fibre Channel SAN, iSCSI SAN). In addition to that, the IEEE 1244 Standard for Removable Media Management defines the architecture and the protocols to share tape drives efficiently across heterogeneous server and application boundaries. To simplify configuration and access control, IEEE 1244 organizes drives in drive groups. Two applications can share IEEE 1244 managed drives, if both applications are authorized to access the drives of a common drive group.

In theory tape management systems like IEEE 1244 allow to share tape drives very flexibly between several applications, but in practice this sharing is limited by bandwidth considerations. Due to bandwidth limitations of the host I/O bus (e.g. PCI bus) and of the I/O ports of the server (e.g. Fibre Channel port, iSCSI port), an I/O port can only utilize a certain number of drives efficiently. If the number of drives utilized by an I/O port is above a certain threshold the performance will suffer.

This number is often referred to as drive limit of an I/O port. Furthermore, in heterogeneous environments different I/O ports may have different drive limits. For instance, a 2 Gbit Fibre Channel port can utilize more drives at full drive speed than a 1 Gbit Fibre Channel port or 1 Gbit iSCSI port. The term drive is not limited to tape drive, it can be any other I/O device such as disk-, optical-, random access memory-, holographic- or nano-technology device.

Prior art uses the following methods and systems to assure that in a drive sharing environment the number of drives which are concurrently used by an I/O port does not exceed its drive limit.

1. Partitioning of resources via software configuration.

A typical approach to not exceed the drive limit of a port is to reduce the number of drives which are visible at the port. Let us say we have two servers each equipped with one I/O port which have a drive limit of n. If the storage administrator knows that both servers need n drives at different times of the day, then he typically zones the same n drives to both servers. This enables the drive sharing between both servers whilst it assures that the respective drive limits are not exceeded.

The drawback of this approach is its lack of flexibility. For instance, manual intervention is required, if one of the drives becomes defunct. The administrator must identify an available spare drive which he can zone to the I/O ports of both servers. Furthermore, he must trigger the operating system of both servers to scan for new hardware before the new drive can be used by the applications. In addition to that the access characteristics of a third server must be well known before it can be integrated in this environment without violating against the resource requirements of the other two servers. Furthermore the configuration must also be adapted if the access characteristics of one of the servers change. Additional measures are required if over the time both servers need the drives at the same time of the day or if over the time the workload of one of the servers can be satisfied with less than one drive. The scenarios lead to SAN zoning changes which are required to improve the aggregated drive utilization of the whole tape infrastructure. Overall this leads to limited flexibility thus this approach does not scale for large environments.

2. Virtual tape server with disk cache

Another approach is to place a disk cache in the I/O path between the servers and the tapes. In such scenarios a so called virtual tape server presents virtual cartridges in virtual tape drives to the server while the virtual tape server internally redirects the data to a disk cache. Later on the virtual tape server destages data from the disk cache via real drives to real tape cartridges. The drawback of this approach is the need for additional hardware and software to build the virtual tape server.

3. Virtual tape server without disk cache

In another scenario the virtual tape server exports virtual tape drives to the servers where the number of virtual tape drives which can be used by a server is limited by a parameter in the software configuration. When a server wants to mount a cartridge then the virtual tape server dynamically connects the virtual tape drive to a physical tape drive. In this way a flexible mapping of physical tape drives to server I/O ports can be achieved. The drawback of this approach is the need for additional hardware and software to build the virtual tape server.

4. Tape drives with multiple ports

Some tape drives are equipped with multiple ports. Additionally multi-pathing software can be used to balance the I/O across all available paths. The drawback of this approach is the need for additional hardware (ports at the tape drive, ports at the storage network to connect the second drive port) and software (such as multi-pathing software). Usually one port is active at the time, the other ports serve redundancy purposes in case there is a problem performing I/O via the active port. Thus, this approach does not scale for large environments.

There is therefore a need for a method and system which facilitates the dynamical distribution of I/O workload distribution among removable media devices attached via multiple host bus adapters.

SUMMARY OF THE INVENTION

In accordance with the present invention there is provided a load balancing method for identifying an input/output (I/O) network path from a set off I/O network paths. Each path of the set off I/O network paths connects a host system via a network to a storage subsystem. The host system comprises at least one host bus adapter (HBA). The storage subsystem comprises at least one I/O device and the network comprises at least one network device. Each of the HBA, the I/O device and the network device comprise at least one I/O port. For each of the at least one I/O port of the at least one HBA, the HBA port limit is determined. The set of the I/O network paths which connect the at least one I/O port of each of the at least one HBA via the I/O ports of the at least one network device to the at least one I/O port of each of the at least one I/O device is then determined. Then a fabric utilization limit is determined for each I/O network path and a HBA port utilization is determined for each of the at least one I/O port of the at least one HBA. All network paths are discarded for which the HBA port utilization is greater than the HBA port limit. For each of the remaining paths a network path distance is determined. All network paths for which the network path distance is greater than the path distance limit are discarded.

Then for each of the remaining paths a fabric utilization is determined. All paths for which the fabric utilization is greater than the fabric utilization limit are discarded and the I/O network path is determined from the remaining network paths.

The present invention is particularly advantageous as it dynamically determines a network path from an HBA to an I/O device by taking into account the parameters HBA port utilization, path distance and fabric utilization. These parameters are checked against the parameters HBA port limit, path distance limit and fabric utilization limit, respectively. In this way the best network path is identified out of all eligible network paths.

In accordance with an embodiment of the invention the HBA port limit is determined for each of the at least one I/O port of each of the at least one HBA by the number of I/O devices that can be served by the I/O port of the HBA in parallel. This is particularly advantageous because the number of I/O devices that can be served by an I/O port of a HBA in parallel is usually specified. The specification can for example be provided by the system administrator or can be read out from the corresponding I/O port by the load balancing system in accordance with the invention. The specification defines the bandwidth one I/O port of a HBA can provide and is directly related by the number of I/O devices which can receive I/O from said HBA I/O port. The bandwidth essentially defines the number of I/O operations per second which can be performed by one HBA I/O port and is usually measured in megabyte per second (MB/s).

In accordance with an embodiment of the invention the HBA port limit is determined for each of the at least one I/O port of each of the at least one HBA by the maximum number of bits per second which can be processed by the I/O port of the HBA. It is particularly advantageous to use the number of bits per second that can be processes an I/O port as the HBA port limit, because this value can be determined dynamically by the load balancing system.

In accordance with an embodiment of the invention, the HBA port utilization of an I/O port of an HBA is determined by the workload (or bandwidth) which is assigned to the I/O port of the HBA. This is particularly advantageous because the workload can be determined dynamically by the load balancing system by sending an inquiry command to the HBA.

In accordance with an embodiment of the invention, the HBA port utilization is determined by use of a drive weight. The drive weight is assigned to an I/O device and the drive weight denotes to the workload of the I/O device.

In accordance with an embodiment of the invention, the HBA port utilization is determined by use of drive weight, which denotes the workload of an I/O device and which is adjusted by a compression ration whereby the compression ratio is obtained from the I/O device.

The present invention is particularly advantageous as it enables to take the HBA port limit of the at least one I/O port of the at least one host bus adapter into account and discards all paths for which the HBA port utilization is greater than the HBA port limit. Notice that each I/O port of each HBA has its own specific HBA port limit. This ensures that only an optimum number of drives are utilized by the I/O ports of the HBAs. This contributes to an overall improvement of the aggregated bandwidth of the whole I/O device infrastructure.

In accordance with an embodiment of the invention the network path distance for each remaining network path is determined by summing the latency of all interconnects comprised in the I/O network path and adding the number of I/O ports comprised in the I/O network path.

In accordance with an embodiment of the invention the fabric utilization is determined by summing the data rates passing through the I/O ports of the at least one network device comprised in a network path. A network path through a network device comprises generally at least two ports, one input port and one output port.

In an embodiment of the invention, the fabric utilization of a network path is determined by the ratio of the number of active I/O ports comprised in the network path to the total number of I/O ports comprised in the network path.

The use of the fabric utilization for the determination of a network path is particularly advantages as the workload of all components comprised in a network path is taken into account. Selecting paths with the lowest fabric utilization offers best utilization of all active resources. Moreover, the current invention is particularly advantageous as it takes the fabric utilization limit of a network path into account and checks if the magnitude of the fabric utilization is below the fabric utilization limit. This ensures that the maximum bandwidth of the I/O device infrastructure is never exceeded.

In accordance with an embodiment of the invention the "best" I/O network path is the remaining network path for which a function taking into account the HBA port utilization, the network path distance, and the fabric utilization yields the lowest functional value. The three parameters HBA utilization, network path distance and fabric utilization are assigned to all paths from which the best path is selected. The function is for example specified by the system administrator. The use of a function for the determination of the best path has the advantage that it enables a system administrator to weight the three parameters equally or differently.

In another aspect the invention relates to a computer program product which comprises computer executable instruction in order to perform the method.

In another aspect the invention relates to a load balancing system for identifying an I/O network path from a set of I/O network paths, the set of I/O network paths connecting a host system via a network to a storage subsystem.

BRIEF DESCRIPTION OF THE DRAWINGS

In the following preferred embodiments of the invention will be described in greater detail by way of example only making reference to the drawings in which.

DETAILED DESCRIPTION

Figure 1:
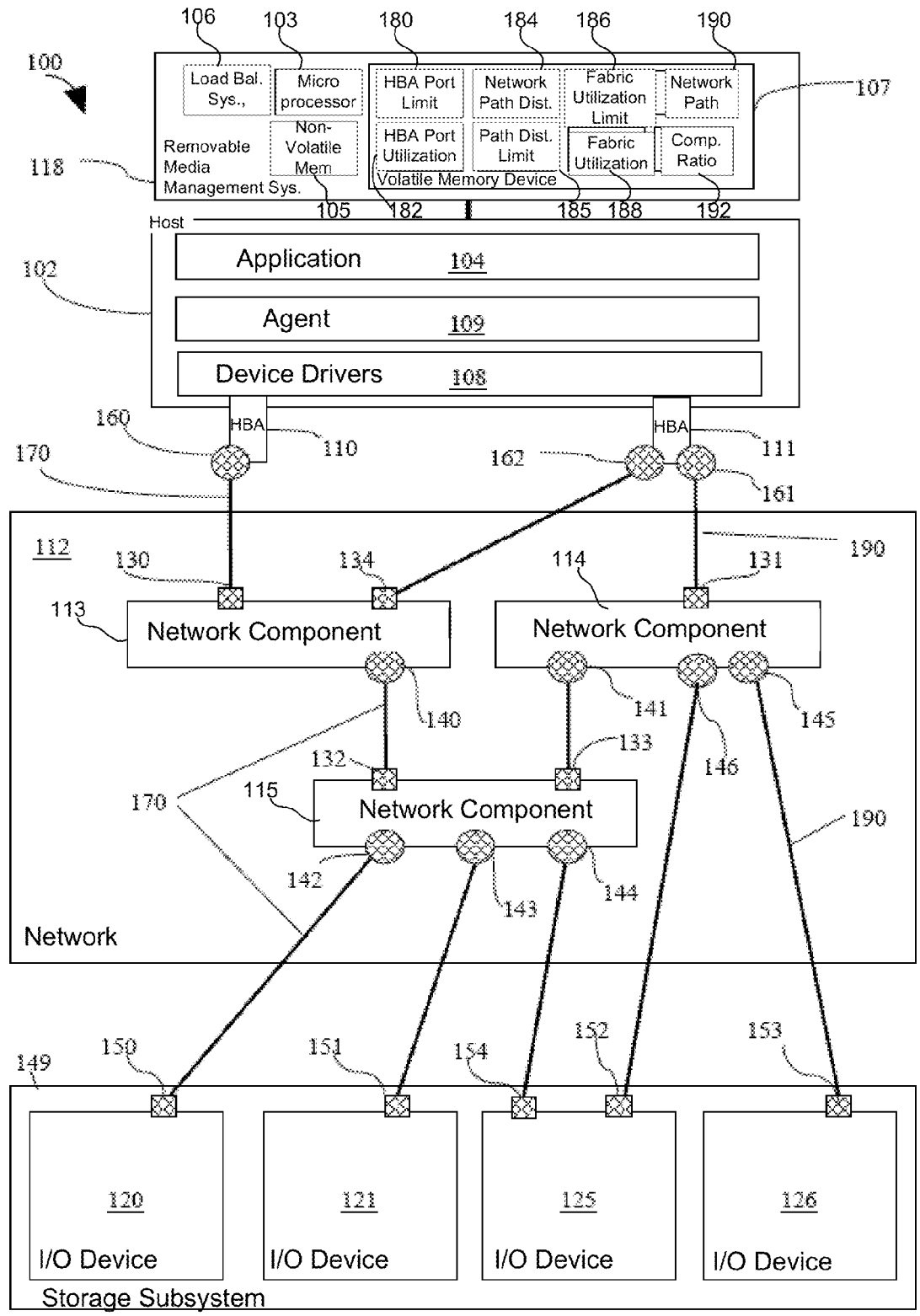
FIG. 1 is a block diagram of a system that implements one embodiment of the present invention.

FIG. 1 is a block diagram of a system that implements one embodiment of the present invention. The system comprises a removable media management system 118, a host system 102, a network 112, a storage subsystem 149. The removable media management system 118 is a computer system which comprises a load balancing system 106, a microprocessor 103, a non-volatile memory device 105, and a volatile memory device 107. The host system is also a computer system, e.g. a server system, which comprises an application 104, an agent 109 to communicate with the removable media management system 118, device drivers 108, and host bus adapters (HBA) 110, 111 that comprise I/O ports 160, 161 and 162 respectively.

The network 112 comprises network components 113, 114, and 115 which are typical network devices such as for example switches, routers, and hubs within a storage network (for example, Fibre Channel, iSCSI). Each network device comprises I/O ports 130, 131, 132, 133, 134, 140, 141, 142, 143, 144, 145, and 146.

The storage subsystem 149 comprises I/O devices 120, 121, 125, and 126. The I/O devices are typically removable media devices such as tape-, disk-, holographic-, nano-technology- or optical I/O devices. Each I/O device 120, 121, 125 and 126 comprises one or more I/O ports 150, 151, 152, 153, and 154, respectively.

An I/O network path connects an I/O port of a HBA via the I/O ports of one or more network devices to the I/O port of an I/O device by use of interconnects. For example, network path 190 connects the I/O port 161 of HBA 111 by use of an interconnect to I/O port 131 of the network device 114 and connects another I/O port 145 of the network device 114 to the I/O port 153 of I/O device 126. It should be noted that a HBA may comprise more than one I/O ports. Up to four I/O ports are typical. Moreover a network device comprises in practice two or more I/O ports and an I/O device can also comprise more than one I/O port.

A path comprises one or more interconnects. An interconnect can be any device by which data is transported from one I/O port to another I/O port. Examples for interconnects are Fibre Channel cables, Ethernet cables, or WAN interconnects like CWDM, DWDM, ATM, Sonet/SDH, or TCP/IP. An interconnect might also be provided by a wireless connection. For example, the host system and the storage subsystem might be interconnected by a wireless local area network, whereby data is transmitted by optical signals from one I/O port to another I/O port, and whereby the optical signals have for example frequencies in the infrared frequency range.

If an optical cable is employed as an interconnect or if a wireless interconnection is used, the interconnect itself can comprise several channels, which differ in the signal frequency. Thus an interconnect can provide several paths whereby each path is characterized by the channel or correspondingly by the optical frequency used for the transfer of data.

A network path might also comprise more than one network component. For example in the I/O network path 170 an interconnect connects I/O port 160 to I/O port 130, then an interconnect connects I/O port 140 to I/O port 132, and additionally an interconnect connects the I/O port 142 to I/O port 150 of the I/O device 120.

A network path might also comprise no network component. The I/O port of an I/O device can be directly connected with an I/O port of a HBA by an interconnect. The network path consists than of said interconnect.

Application 104 accesses the I/O devices 120, 121, 125, and 126 by use of the host system 102. The host system 102, more particular the application 104, contacts the load balancing system 106 comprised in the media management system 118 via the agent 109 and an appropriate communication method such as TCPIP. The load balancing system 106 determines a network path 170 from the set of network paths by which application 104 can read or write data to the I/O devices 120, 121, 125, 126. The application 104 might contact the load balancing system 106 as a result of a data access request such as a mount, read or write command. Various embodiments of the method employed to identify the I/O network path from the set of network paths are described below.

The load balancing system 106 uses the agent 109 to determine some parameters of the network and the storage subsystem 149 which are stored on the volatile memory device 107. Alternatively, they can be stored on the non-volatile memory device 105. The host system 102 employs one or more device drivers 108 in order to access the I/O devices 120, 121, 125 and 126.

The system in accordance with the invention is however by no means restricted to this embodiment. For example the media management system 118 which comprises the load balancing system 106 might be comprised in the host system 102 or in the storage subsystem 149. The media management system 118 might for example be implemented into the host system 102 in form of a library manager which is built-in to an application. The media management system 118 might for example be implemented into the storage subsystem 149 in form of an advanced library manager for a tape library. However, the advantage of an external media management system 118 is that it can be used simultaneously by several host systems which are connected to different network and storage subsystems or to the same network and storage subsystems.

The set of network paths consists of all paths that connect I/O ports 160, 161 or 162 of the HBA 110 or 111 via the network 112 to the I/O devices 120, 121, 125, and 126 of the storage subsystem 149. For example the I/O network path 170 is embodied by the interconnect leading from I/O port 160 of HBA 110 to I/O port 130 of network device 113 plus the interconnect from I/O port 140 of network device 113 leading to I/O port 132 of network device 115 plus the interconnect leading from I/O port 142 of network device 115 to the I/O port 150 of I/O device 120.

In accordance with an embodiment of the invention the load balancing system 106 determines besides other parameters specified below the following parameters, which are stored on the volatile memory device 107 or non-volatile memory device 105: HBA port limit 180, HBA port utilization 182, network path distance 184, path distance limit 185, fabric utilization limit 186, fabric utilization 188, a compression ratio 192, and a drive weight 194. A detailed description how these parameters are determined will be given below.

The load balancing method is executed by the microprocessor 103 in response to the reception of a data access request from application 104. Examples for data requests include the mount request for a cartridge, a connection establishing from a SCSI source to a SCSI target in a storage network, and the creation of a new zone in a storage network.

Figure 2:
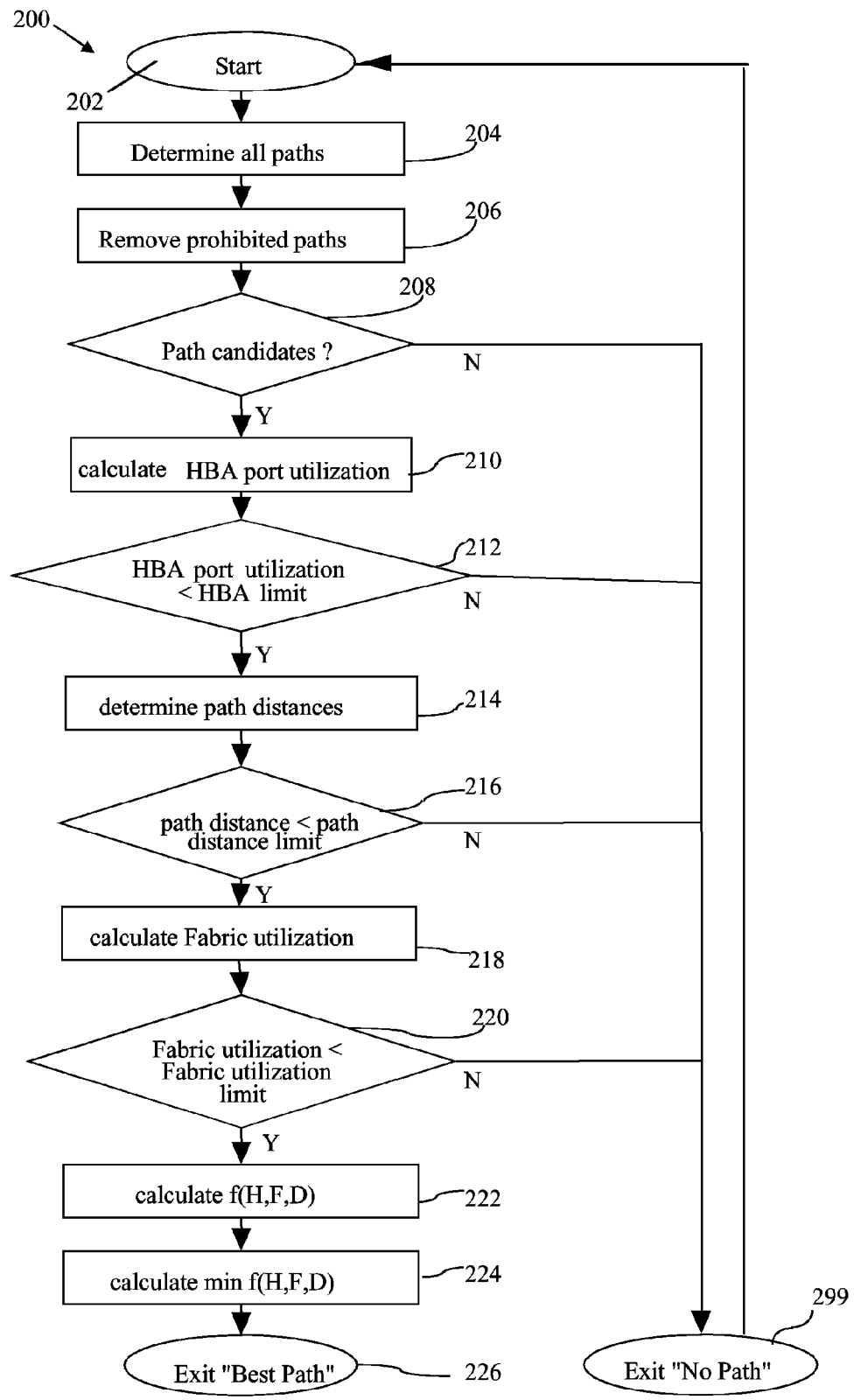
FIG. 2 is a flow diagram illustrating how the I/O network path is determined in a preferred embodiment of the invention.

FIG. 2 depicts a flow diagram illustrating how in a preferred embodiment of the invention the "best" I/O network path is determined. The process starts at 202 and flows to 204 where the set of all paths is determined. Each I/O network path describes a route from an I/O port of a HBA (the host system can comprise more than one HBA whereby each HBA comprises one or more I/O ports) of the system to an I/O port of an I/O device (the storage subsystem can also comprise more than one I/O device which can comprise more than one I/O port) via the network. An I/O port of a HBA is also referred to in the following as HBA port. As a result of step 204 the set $P_{204}$ describes the set of all paths. Step 206 removes all paths which are not eligible for I/O. An example of a non-eligible I/O network path includes a physical I/O network path which is not member of an active Fibre Channel zone. Another example for non-eligible network paths are devices which are not free or available. A device might not be free because it is in use by another application or another host system. A device might not be available when it is defective or offline. Note, for the processing of a new data access request step 204 only considers paths to drives which are currently not in use. As a result of step 206 the set $P_{206}$ describes the collection of all eligible paths. In an alternative embodiment step 204 determines only eligible paths thus step 206 can be omitted.

The process flows then to decision checkpoint 208. If at this point no eligible paths are left ($P_{206}=\emptyset$) then the process ends with step 299. Step 299 indicates that at this point in time no eligible paths are available. The action performed in or as a result of step 299 depends on the environment. For instance, in a removable media management system the respective mount request could either be blocked which means that the mount request is added to mount request queue or be rejected. In another embodiment a storage network capacity planning module could deny a respective zoning or access request. In yet another embodiment step 299 can loop back to step 202 the starting point of this flowchart in order to retry the path finding. In yet another embodiment an on-demand module can be invoked which dynamically provides additional infrastructure in order to add more paths to the set of paths $P_{204}$.

If there are eligible paths at checkpoint 208 which satisfy the access request ($P_{206} \bullet \emptyset$), then the process continues with step 210. Step 210 builds the set H of all I/O ports h of host bus adapters where h is starting point of at least one I/O network path p element $P_{206}$ ($p \in P_{206}$) Furthermore, in step 210 the HBA port utilization $u_h$ is determined for each host bus adapter I/O port h element of H under the assumption that the access request is scheduled. Alternate embodiments for the calculation of the HBA port utilization are detailed later.

Then the process flows to step 212. Step 212 compares the HBA port utilization $u_h$ of each HBA port $h \in H$ with the HBA port limit $l_h$ and discards all paths p with HBA port utilization $u_h>$HBA port limit $l_h$ 180. In one embodiment the HBA port limit $l_h$ is determined dynamically after process 200 has been triggered by an application. This determination is based on the parameters of the network components in network and I/O device characteristics in a storage system which are scanned and inquired by the processor of the media management system. For example the load balancing system inquiries all components associated with a network path and determines the maximum data rate possible in a path. This maximum data rate is than equivalent to the HBA port limit. In another embodiment the HBA port limit $l_h$ is configured by the user for each HBA port. The parameter HBA port limit $l_h$ is further explained later. The result of step 212 is the set of network paths $P_{212}$ where $P_{212}=\{p \in P_{206}$ with 'h is starting point of p' AND 'new HBA port utilization $u_h \leq$HBA port limit $l_h$'}.

If no eligible candidates are determined in step 212 ($P_{212}=\emptyset$) the process flows to step 299 indicating that no eligible path has been found.

Otherwise the process flows to step 214 where the network path distance $N_p$ of all remaining paths $p \in P_{212}$ is determined. The network path distance $N_p$ for a path $p \in P_{212}$ is the physical distance between two ports or the length of the interconnects. The network path distance $N_p$ for a path $p \in P_{212}$ can be determined automatically by the microprocessor of the media management system for example by sending test packages on the network and measuring the turn around times. The turn around time is proportional to the distance said package has to travel on the network. In an alternate embodiment the network path distance $N_p$ is user configurable, which means that the user configures the distance for any given path in the network. The parameter network path distance is further explained later.

The next step 216 discards all paths $p \in P_{212}$ for which the network path distance $N_p$ of I/O network path p is larger than the path distance limit $l_d$. In one embodiment of the invention the path distance limit $l_d$ is determined dynamically by the load balancing system in accordance with the invention after process 200 has been triggered by an application. This determination is based on the parameters of the network components connecting the host system and storage subsystem which are scanned and inquired. In another embodiment the path distance limit is configured by the user for each interconnect. The parameter path distance limit $l_d$ is further explained later. The result of step 216 is the set of $P_{216}$ where $P_{216}=\{p \in P_{212}$ with 'network path distance $N_p$ of I/O network path $p \leq$path distance limit $l_d$ of I/O network path p'}. The processing stops here with step 299 if no eligible candidates are left ($P_{216}=\emptyset$).

Step 218 calculates the fabric utilization of all remaining paths p element $P_{216}$. The fabric utilization $F_p$ for a path $p \in P_{216}$ is defined by the workload a fabric F including the path p has to manage. The fabric utilization $F_p$ for a path $p \in P_{216}$ can be determined automatically by the microprocessor of the media management system for example by sending inquiries to the network components of the fabric F inquiring the number of I/Os per second. This number is then accumulated across all network components relating to the path p in fabric F. The parameter fabric utilization is further explained later.

Next step 220 discards all paths p element $P_{216}$ with fabric utilization of path p is larger than fabric utilization limit $l_f$ of I/O network path p. In one embodiment of the invention the fabric utilization limit $l_f$ is determined dynamically by the load balancing system in accordance with the invention after process 200 has been triggered by an application. This determination is based on the parameters of the network components in network connecting the host system and storage subsystem which are scanned and inquired. In another embodiment the fabric utilization limit is configured by the user. The parameter fabric utilization limit $l_F$ is further explained later.

The result of step 220 is the set $P_{220}$ where $P_{220}=\{p \in P_{216}$ with 'new fabric utilization of path $p \leq$fabric utilization limit of path p'}. If no eligible candidates are left in $P_{220}$ ($P_{220}=\emptyset$) the process flows to step 299 indicating no eligible path has been found. Otherwise all paths $p \in P_{220}$ do not exceed the bandwidth and are therefore potential candidates for the "best path" and the process flows to step 222. Thus the remaining steps of the processing do not discard additional paths but they determine the optimal path.

Step 222 introduces a function f which weights the three parameters HBA port utilization $u_h$, fabric utilization $p_f$, and distance $p_d$. In one embodiment the function f is a weighted sum f ($u_h$, $p_f$, $p_d$)=$a \times u_h + b \times p_f + c \times p_d$, where a, b, and c are constant values specified for example by the system administrator.

Finally, in step 224 the I/O network path $p_{min}$ for which the function f given above yields the lowest functional value: $p_{min}$=min(f ($u_h$, $p_f$, $p_d$)) of all $p \in P_{220}$ is selected. The processing ends with step 226 which returns the determined network path as the "best path" featuring the best performance.

In an embodiment of the invention, only the steps 202 to 212, and either step 226 or step 299 are carried out. As mentioned above, the result of step 212 is the set of network paths $P_{212}$ where $P_{212}=\{p \in P_{206}$ with 'h is starting point of p' AND 'new HBA port utilization $u_h \leq$HBA port limit $1_h$'}. If $P_{212} \neq \emptyset$, then the process continues with step 226, where one network path from the set $P_{212}$ is selected, for example by selecting the first network path from the list $P_{212}$, or by selecting randomly the network path from the set $P_{212}$. If $P_{212}=\emptyset$, then the process continues with step 299.

According to this invention each I/O network path p element $P_{220}$ is characterized by three parameters (a) HBA port utilization, (b) network path distance 184 and (c) fabric utilization which are used to determine the "best path". These parameters are explained below.

HBA port utilization $u_h$—It keeps track how much workload is currently assigned to an I/O port of a HBA and is expressed in megabyte per second (MB/s). Its value is zero if currently no drive is used at this HBA port. If one or more drives are scheduled for use at an HBA port then this value is set to the sum of a drive weight of the respective drives.

The drive weight is an additional parameter which denotes how much I/O resources an I/O device consumes. It is expressed by an I/O rate in megabyte per second (MB/s). This parameter can be obtained automatically by sending an inquiry command to the drive instructing the drive to report which data rate can be achieved. The inquiry command is for example a SCSI INQUIRY command which inquiries a drive for its characteristics where one parameter usually denotes the drive bandwidth. The drive bandwidth denotes for example the data rate which an I/O device can handle and is usually expressed in megabytes per second. In an alternate embodiment the parameter drive weight can be configured by the user. In yet another embodiment the drive weight is dynamically adjusted based on the I/O device operations by the media management system in accordance with the invention. An I/O device usually keeps statistics about the data rates which were processed in a foregoing operation. This statistics can be inquired by the media management system. An example for the inquiry command is the SCSI LOG SENSE command. Based on this information the media management system can dynamically update the drive weight by calculating the average I/O rate across multiple mounts.

In one embodiment the drive weight parameter is adjusted by the compression ratio when the drive weight relates to uncompressed data. Compression is usually done at the I/O device level at a certain ratio and influences the I/O rate of an I/O device. In this embodiment the drive weight parameter is multiplied with the compression ratio before it is added to HBA port utilization and compared with the HBA port limit. In one embodiment the compression ratio parameter is inquired by the media management from the I/O device. The media management system calculates a compression ratio average and stores it in the volatile memory device. The inquiry command is a SCSI-3 LOG SENSE command. In another embodiment the compression ratio is configured by the user.

The method for updating the HBA port utilization is quite simple. It starts when no I/O device is used via that port, with the value zero. If as a result of the process in FIG. 2 a I/O device is scheduled for an HBA port (mount request) then the value of the HBA port utilization is increased by the drive weight parameter which might be adjusted by the compression ratio of the I/O device. The HBA port utilization is than stored in the media management system. If a drive is de-scheduled from a HBA port (un-mount request) then the value of the HBA port utilization is decreased by drive weight.

Network Path Distance $N_p$—The network path distance is primarily presented by length of the I/O network path which is the sum of the physical length of the interconnects comprised in the I/O network path. The preferred embodiment is to include the number of I/O ports involved in the I/O network path. The reason for this is that each port represents some level of overhead which influences the data rate and should therefore be taken into consideration. The network path distance is measured in a length entity such as meters (m) according to the preferred embodiment. In an alternate embodiment this parameter is expressed in the turn-around time of a data package on this path measured in a time unity such as milliseconds (ms). In order to determine the length of a given network path the load balancing process either send packages across the path and measure the turn around time, similar to a "ping" command according to the TCPIP protocol. The turn-around time is stored as the network path distance parameter in the memory device of the media management system. In an alternate embodiment the path distance is configured by the user and expressed in meters.

Fabric utilization $F_p$—describes the utilization of the fabric in which the path p resided. A fabric consists of a number of switches or network components. A network component or switch consists of a number of I/O ports. The fabric utilization for path p is calculated by the sum of the I/O rate of the I/O ports within the path. Therefore not the entire fabric is considered, but only the components in the I/O network path between one HBA and one I/O device. This parameter is expressed by a data rate such as megabyte per second describing the comprised data rate of ports pertaining the path p within the fabric. The load balancing system determines the data rate of the ports pertaining to a path through appropriate commands. For example SAN switch components according to prior art provide an application programming interface (API) for an outbound connection which the load balancing system can use to inquiry the data rate of a I/O port. In an alternate embodiment fabric utilization for a path p is determined by the ratio of the number of active ports in the fabric to the total numbers of ports in the fabric. The activity of ports is inquired by the load balancing system 106 through for example the API provided by SAN components. This parameter is determined as part of step 218 of process in FIG. 2. Since the fabric utilization changes dynamically it can alternatively determined in the background.

By utilizing this parameter the load balancing method and system in accordance with the invention take the workload of all components of the path into account which connect a HBA port and the I/O device. Selecting paths with the lowest fabric utilization offers equal utilization of all resources.

The process described in FIG. 2 also includes limits or thresholds for these parameters allowing to exclude certain paths such as (a) HBA Port Limit, (b) Network path distance limit and (c) Fabric utilization limit. These limits are compared to one of three parameters outlined above in steps 212, 216 and 220 and further explained below.

HBA Port Limit $l_h$—The HBA port limit is a new metadata attribute for each port of an HBA. In one embodiment the HBA port limit represents just a number of drives which this port may serve in parallel. In another embodiment the HBA port limit represents the maximum throughput (e.g. 100 Gbits) which the port can handle. In another embodiment where the interconnect is an optical cable or a wireless connection which comprise several channels, whereby data is transferred on each channel by use of a different optical frequency, the HBA port limit can also be the number of channels that can be handled by the HBA port.

Path Distance Limit $l_d$—describes the maximum allowed distance of a path and is compared against the path distance. The path distance limit is a constant value configured by the user.

Fabric utilization limit $l_f$—describes the maximum allowed utilization of a fabric and is compared against the fabric utilization. The fabric utilization limit is configured by the user.

Figure 3:
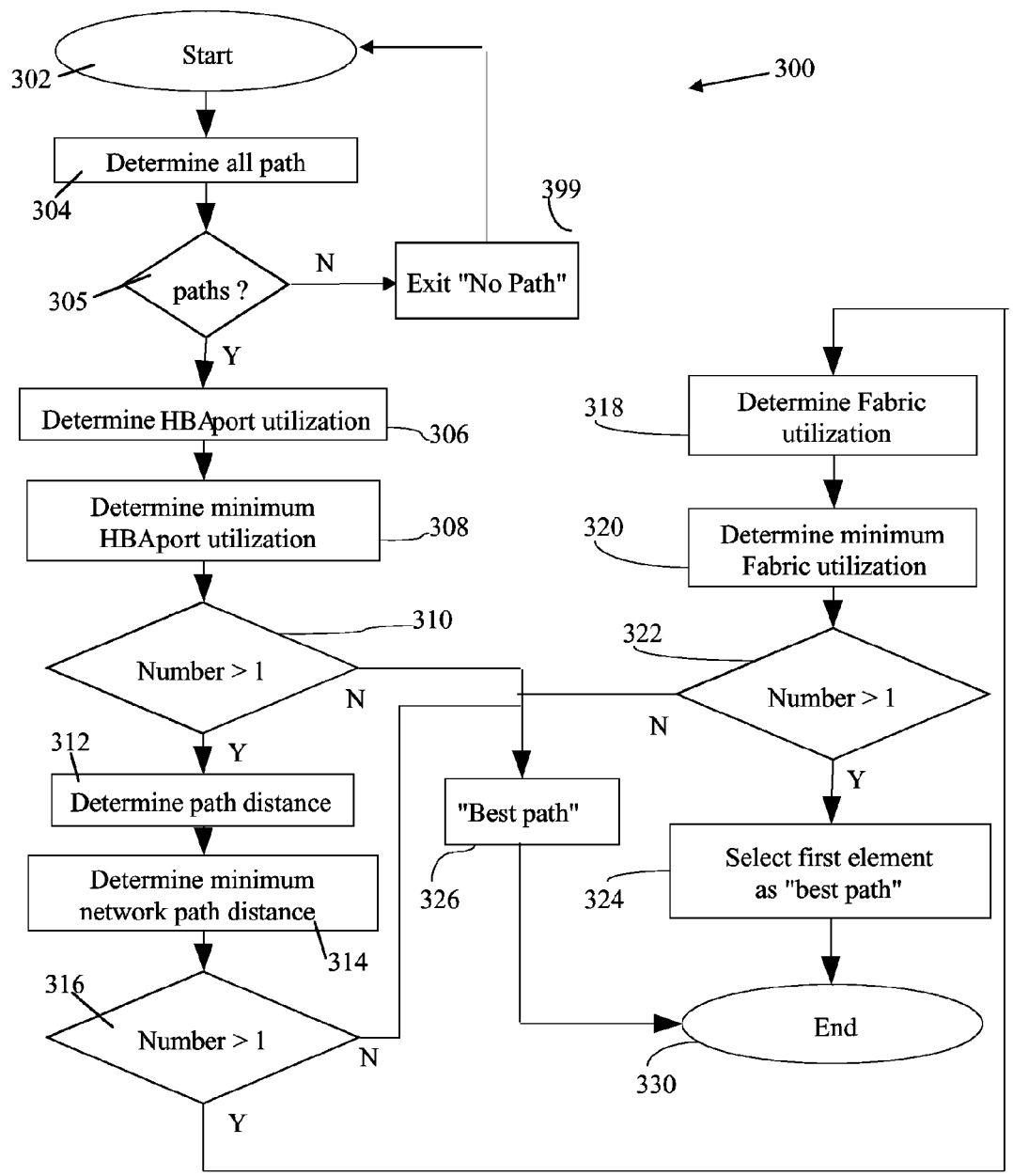
FIG. 3 is a flow diagram showing how the I/O network path is determined in another preferred embodiment of the invention.

FIG. 3 teaches another embodiment to select the "best I/O network path" The essential difference with respect to the process described by 200 is that the process 300 does not remove prohibited paths. Particularly process 300 does not consider limits for HBA port utilization, limits for network path distance, and limits for fabric utilization. Instead this process selects the minimum for each of the three parameters (a) HBA port utilization, (b) network path distance and (c) fabric utilization as explained above. This embodiment shows along with the embodiment described in FIG. 2 that there are various alternatives for the implementation of the load balancing system.

The process 300 is executed by the load balancing system 106 in response to a data access request from application 104. An alternative embodiment is that this process is executed in time of less utilization of the host system 102.

The process 300 starts at 302 and flows to 304 where the set of all paths is determined. Each I/O network path describes the route from the I/O ports 160, 161, or 162 of the host bus adapters 110 or 111 of the host system 102 via the network 112 to the at least one I/O port of I/O device 120, 121, 125 and 126. For example the I/O network path 170 includes I/O port 160 of HBA 110, the interconnect leading from I/O port 160 to I/O port 130, the network device 113, the interconnect leading from I/O port 140 to I/O port 132, the network device 115, and the interconnect leading from I/O port 142 to I/O port 150 of I/O device 120.

In step 305 it is checked if there are any network paths. If there is no network path, the flow continues with step 399 and stops, whereby no path is determined. If there is at least one network path, the flow continues with step 306. In step 306 the HBA port utilization of each I/O port 160, 161 or 162 of each host bus adapter 110 or 111 is determined. Step 308 determines the I/O port 160, 161 or 162 with the lowest utilization. In step 310 the HBA port utilization of the HBA port 160, 161 and 162 is compared and the HBA port with lowest utilization is selected. If there is only one I/O network path with a minimum HBA port utilization the process continues with step 326 discussed later.

Otherwise, if there is more than one I/O network path with a minimum utilization the process continues with step 312 where the distance between the host bus adapter ports 160, 161 and 162 the I/O ports 150, 151, 152, 153, and 154 of the drives 120, 121, 125, 126 is determined for the I/O network paths which have the same minimum utilization.

In step 314 the minimum network path distance is determined among the I/O network paths considered in step 312. In step 316 the decision is made if the number of paths with the minimum distance is greater than one. If the answer is NO—i.e. only one path—the process continues with step 326 discussed later. If there is more than one I/O network path with a minimum distance, the process flows to step 318 where the fabric utilization is determined for all paths with the minimum network path distance. In step 320 the minimum fabric utilization for the I/O network paths is determined.

The process flows then to step 322 where the determination is made whether there is more than one I/O network path with minimum fabric utilization. If the answer is NO—only one path—the process flows to step 326. Step 326 receives from step 310, step 316 or step 322 exactly one I/O network path. This I/O network path is identified as the "best path" in step 326. Step 326 flows to the end 330.

If the decision in step 322 is that there is more than one network path with the minimum fabric utilization, then the process flows to step 324 where the so called first network path is selected. In an embodiment of the invention, all network paths determined in step 322 are stored in a list. The so called first network path is then the I/O network path which is the first element of the list. An alternative embodiment of the invention is to select the last I/O network path in the list. Step 324 flows to the end point.

In an embodiment of the invention only steps 302 to 310, and either step 326 or step 399 are carried out. If the number of paths determined in step 310 is larger than one, then one path is selected for example randomly and the method exits in step 326 with the "best path".

List of Reference Numerals

100 Block diagram
102 Host system
103 Microprocessor
104 Application
105 Non-volatile memory device
106 Load balancing system
107 Volatile memory device
108 Device drivers
109 Agent
110 Host bus adapter
111 Host bus adapter
112 Network
113 Network component
114 Network component
115 Network component
118 Removable media management system
120 I/O device
121 I/O device
125 I/O device
126 I/O device
130 I/O port
131 I/O port
132 I/O port
133 I/O port
134 I/O port
140 I/O port
141 I/O port
142 I/O port
143 I/O port
144 I/O port
145 I/O port
146 I/O port
149 Storage subsystem
150 I/O port
151 I/O port
152 I/O port
153 I/O port
154 I/O port
160 I/O port
161 I/O port
162 I/O port
170 Network path
180 HBA port limit
182 HBA port utilization
184 Network path distance
185 Path distance limit
186 Fabric utilization limit
188 Fabric utilization
190 network path
192 compression ratio
194 drive weight
199 Client computer
200 Flow diagram
202 Start
204 Determine set of network paths
206 Remove prohibited paths
208 Select I/O network path candidates
210 Determine HBA port utilization
212 Compare HBA port utilization with HBA port limit and select
214 Determine network path distance
216 Select
218 Determine fabric utilization
220 Select
222 Determine f
224 Determine lowest functional value of f and select -continued List of Reference Numerals

| | |
|---|---|
| 226 | Exit "Best Path" |
| 229 | Exit "No Path" |
| 300 | Flow diagram |
| 302 | Start |
| 304 | Determine set of network paths |
| 305 | Decision |
| 306 | Determine HBA port utilization |
| 308 | Determine I/O network path with minimum HBA port utilization |
| 310 | Decision |
| 312 | Determine network path distance |
| 314 | Determine I/O network path with minimum network path distance |
| 316 | Select |
| 318 | Determine fabric utilization |
| 320 | Determine minimum Fabric utilization |
| 322 | Select |
| 324 | Select path as "Best Path" |
| 326 | Determine "Best Path" |
| 330 | End |
| 399 | Exit "No Path" |

The invention claimed is:

1. A load balancing method for identifying a network path from a plurality of network paths between a system and a plurality of Input/Output devices, wherein each network path defines a route through a fabric between one of a plurality of I/O ports used by the system and one of a plurality of I/O ports used to communicate with one of the I/O devices, comprising:
determining eligible network paths that are available to be used to communicate between the system and the I/O devices;
selecting one of the eligible network paths based on criteria for each of the eligible network paths, comprising:
an I/O port utilization of the I/O port for the system based on I/O resources consumed by at least one of the I/O devices assigned to the I/O port for the system;
a network path distance based on a distance between the I/O port for the system and the I/O port on the I/O device in the network path;
a fabric utilization indicating data rates of ports in the network path between the ports on the system and the I/O device; and
using the selected network path for communication between the system and the I/O device to which the system connects on the network path.

2. The method of claim 1, wherein selecting one network path based on the criteria comprises:
determining a set of network paths having the I/O port utilization less than an I/O port limit; having the network path distance less than a path distance limit; having the fabric utilization that does not exceed a fabric utilization limit; and
selecting one of the network paths in the determined set as the selected network path to use for communication.

3. The method of claim 2, wherein selecting one of the network paths in the determined set when the determined set indicates a plurality of network paths comprises:
calculating for each network path in the determined set a result of a function weighting the I/O port utilization, network path distance, and fabric utilization for the network path;
selecting one of the network paths in the determined set based on the calculated results of the function applied to each network path.

4. The method of claim 1, wherein the I/O port utilization of the I/O port on the system comprises an I/O rate of at least one of the I/O devices assigned to the I/O port on the system.

5. The method of claim 1, wherein the fabric utilization is determined by summing data rates at I/O ports in the network path.

6. The method of claim 1, wherein the fabric utilization is determined by a ratio of a number of active I/O ports in the network paths to a total of I/O ports in the fabric including the network path.

7. The method of claim 1, wherein selecting one network path of the plurality of network paths based on the criteria comprises:
performing a first determination to determine at least one network path having a minimum of one of the I/O port utilization, network path distance, and the fabric utilization;
using the determined network path determined during the first determination in response to the first determination resulting in only one determined network path;
performing a second determination to determine from one of the network paths determined during the first determination at least one network path having a minimum of one of the criteria not considered during the first determination;
using the determined network path determined during the second determination in response to the second determination resulting in only one determined network path;
performing a third determination to determine from one of the network paths determined during the second determination at least one network path having a minimum of one of the criteria not considered during the first and second determinations; and
using one of the at least one network path resulting from the third determination.

8. A system in communication with a plurality of I/O devices over network paths in a fabric, comprising:
a plurality of I/O ports capable of connecting to I/O ports of the I/O devices to form network paths defining a route through the fabric between one of a plurality of I/O ports used by the system and one of a plurality of I/O ports of one of the I/O devices;
a load balancing system executed to perform operations, the operations comprising: determining eligible network paths that are available to be used to communicate between the system and the I/O devices;
selecting one of the eligible network paths based on criteria for each of the eligible network paths, comprising:
an I/O port utilization of the I/O port for the system based on I/O resources consumed by at least one of the I/O devices assigned to the I/O port for the system;
a network path distance based on a distance between the I/O port for the system and the I/O port on the I/O device in the network path;
a fabric utilization indicating data rates of ports in the network path between the ports on the system and the I/O device; and
using the selected network path for communication between the system and the I/O device to which the system connects on the network path.

9. The system of claim 8, wherein selecting one network path based on the criteria comprises:
determining a set of network paths having the I/O port utilization less than an I/O port limit; having the network path distance less than a path distance limit; having the fabric utilization that does not exceed a fabric utilization limit; and
selecting one of the network paths in the determined set as the selected network path to use for communication.

10. The system of claim 9, wherein selecting one of the network paths in the determined set when the determined set indicates a plurality of network paths comprises:
calculating for each network path in the determined set a result of a function weighting the I/O port utilization, network path distance, and fabric utilization for the network path; selecting one of the network paths in the determined set based on the calculated results of the function applied to each network path.

11. The system of claim of 10, wherein the I/O port utilization of the I/O port on the system comprises an I/O rate of at least one of the I/O devices assigned to the I/O port on the system.

12. The system of claim 8, wherein the fabric utilization is determined by summing data rates at I/O ports in the network path.

13. The system of claim 8, wherein the fabric utilization is determined by a ratio of a number of active I/O ports in the network paths to a total of I/O ports in the fabric including the network path.

14. The system of claim 8, wherein selecting one network path of the plurality of network paths based on the criteria comprises:
performing a first determination to determine at least one network path having a minimum of one of the I/O port utilization, network path distance, and the fabric utilization;
using the determined network path determined during the first determination in response to the first determination resulting in only one determined network path;
performing a second determination to determine from one of the network paths determined during the first determination at least one network path having a minimum of one of the criteria not considered during the first determination;
using the determined network path determined during the second determination in response to the second determination resulting in only one determined network path;
performing a third determination to determine from one of the network paths determined during the second determination at least one network path having a minimum of one of the criteria not considered during the first and second determinations; and
using one of the at least one network path resulting from the third determination.

15. A computer readable storage medium implementing a load balancing program for identifying a network path from a plurality of network paths between a system and a plurality of Input/Output devices, wherein each network path defines a route through a fabric between one of a plurality of I/O ports used by the system and one of a plurality of I/O ports used to communicate with one of the I/O devices, wherein the load balancing program performs operations, the operations comprising:
determining eligible network paths that are available to be used to communicate between the system and the I/O devices;
selecting one of the eligible network paths based on criteria for each of the eligible network paths, comprising:
an I/O port utilization of the I/O port for the system based on I/O resources consumed by at least one of the I/O devices assigned to the I/O port for the system;
a network path distance based on a distance between the I/O port for the system and the I/O port on the I/O device in the network path;
a fabric utilization indicating data rates of ports in the network path between the ports on the system and the I/O device; and
using the selected network path for communication between the system and the I/O device to which the system connects on the network path.

16. The computer readable storage medium of claim 15, wherein selecting one network path based on the criteria comprises:
determining a set of network paths having the I/O port utilization less than an I/O port limit;
having the network path distance less than a path distance limit; having the fabric utilization that does not exceed a fabric utilization limit; and
selecting one of the network paths in the determined set as the selected network path to use for communication.

17. The computer readable storage medium of claim 16, wherein selecting one of the network paths in the determined set when the determined set indicates a plurality of network paths comprises:
calculating for each network path in the determined set a result of a function weighting the I/O port utilization, network path distance, and fabric utilization for the network path;
selecting one of the network paths in the determined set based on the calculated results of the function applied to each network path.

18. The computer readable storage medium of claim 15, wherein the I/O port utilization of the I/O port on the system comprises an I/O rate of at least one of the I/O devices assigned to the I/O port on the system.

19. The computer readable storage medium of claim 18, wherein the I/O port utilization is calculated by adjusting the I/O rates of the I/O devices assigned to the I/O port for the system by compression ratios used at the I/O devices.

20. The computer readable storage medium of claim 15, wherein the network path distance for each network path is calculated by summing a latency of all interconnects comprised in the network path and adding a number of I/O ports in the network path.

21. The computer readable storage medium of claim 15, wherein the fabric utilization is determined by summing data rates at I/O ports in the network path.

22. The computer readable storage medium of claim 15, wherein the fabric utilization is determined by a ratio of a number of active I/O ports in the network paths to a total of I/O ports in the fabric including the network path.

23. The computer readable storage medium of claim 15, wherein selecting one network path of the plurality of network paths based on the criteria comprises:
performing a first determination to determine at least one network path having a minimum of one of the I/O port utilization, network path distance, and the fabric utilization;
using the determined network path determined during the first determination in response to the first determination resulting in only one determined network path;
performing a second determination to determine from one of the network paths determined during the first determination at least one network path having a minimum of one of the criteria not considered during the first determination;
using the determined network path determined during the second determination in response to the second determination resulting in only one determined network path;
performing a third determination to determine from one of the network paths determined during the second determination at least one network path having a minimum of one of the criteria not considered during the first and second determinations; and using one of the at least one network path resulting from the third determination.

24. A computer readable storage medium including a load balancing program executed to identify an input/output (I/O) network path from a set of I/O network paths connecting a host system via a network to a storage subsystem, the host system comprising at least one host bus adapter (HBA), the storage subsystem comprising at least one I/O device, the network comprising at least one network device, wherein each of the HBAs, each of the I/O devices, and each of the network devices include at least one I/O port, wherein the load balancing program performs operations, the operations comprising:

determining an HBA port limit for each of the at least one I/O port of each of the at least one HBAs;

determining a set of I/O network paths connecting the at least one I/O port of each of the at least one HBAs via the I/O ports of the at least one network device to the at least one I/O port of each of the at least one I/O device;

determining for each I/O network path a fabric utilization limit;

determining an HBA port utilization for each of the at least one I/O ports of the at least one HBA based on I/O resources consumed by at least one of the I/O devices assigned to the HBA;

discarding all network paths for which the HBA utilization is greater than the HBA port limit;

determining a network path distance for each of the remaining network paths;

discarding all network paths for which the network path distance is greater than the path distance limit;

determining a fabric utilization for each of the remaining network paths;

discarding all network paths for which the fabric utilization is greater than the fabric utilization limit;

determining the I/O network path from the remaining network paths.

* * * * *